United States Patent
Popescu et al.

(10) Patent No.: US 10,282,411 B2
(45) Date of Patent: May 7, 2019

(54) SYSTEM, METHOD, AND RECORDING MEDIUM FOR NATURAL LANGUAGE LEARNING

(71) Applicant: International Business Machines Corporation, Armonk, NY (US)

(72) Inventors: Octavian Popescu, Yorktown Heights, NY (US); Vadim Sheinin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 15/087,050

(22) Filed: Mar. 31, 2016

(65) Prior Publication Data

US 2017/0286403 A1    Oct. 5, 2017

(51) Int. Cl.
*G06F 17/27* (2006.01)

(52) U.S. Cl.
CPC .......... *G06F 17/271* (2013.01); *G06F 17/277* (2013.01); *G06F 17/2785* (2013.01)

(58) Field of Classification Search
None
See application file for complete search history.

(56) References Cited

U.S. PATENT DOCUMENTS

| | | | | |
|---|---|---|---|---|
| 7,822,597 B2* | 10/2010 | Brun | ...................... | G06F 17/271 704/1 |
| 8,041,697 B2* | 10/2011 | Rayner | ............. | G06F 17/30616 704/9 |
| 8,069,045 B2* | 11/2011 | Emam | ................... | G06F 17/273 704/255 |
| 8,321,220 B1* | 11/2012 | Chotimongkol | ....... | G09B 19/04 704/10 |
| 8,392,436 B2* | 3/2013 | Bai | ................... | G06F 17/30654 704/9 |
| 8,463,591 B1* | 6/2013 | Chang | ................... | G06F 17/271 704/1 |
| 8,949,170 B2 | 2/2015 | Zadeh | | |

(Continued)

FOREIGN PATENT DOCUMENTS

WO    WO 2015/160544 A1    10/2015

OTHER PUBLICATIONS

Anonymously; "Online Phrase Representation System"; http://ip.com/IPCOM/000243004D; Sep. 8, 2015.

(Continued)

*Primary Examiner* — Thuykhanh Le
(74) *Attorney, Agent, or Firm* — Rahan Uddin, Esq.; McGinn IP Law Group, PLLC

(57) ABSTRACT

A natural language learning method, system, and non-transitory computer readable medium include analyzing a corpus of sentences stored in a database to identify an internal structure of words in the corpus of sentences, creating a plurality of new words that are a combination of the internal structure of a word of the words in the corpus of sentences and the word, clustering the plurality of new words created by the creating that match into a plurality of cluster groups, filtering the plurality of cluster groups to create a partial set of each of the plurality of cluster groups, and performing word embedding processing on the partial set of each of the plurality of cluster groups to obtain vectors for new words.

19 Claims, 5 Drawing Sheets

(56) References Cited

U.S. PATENT DOCUMENTS

| | | | |
|---|---|---|---|
| 9,262,406 B1* | 2/2016 | Das | G06F 17/289 |
| 2003/0236659 A1* | 12/2003 | Castellanos | G06F 17/271 |
| | | | 704/4 |
| 2004/0024585 A1* | 2/2004 | Srivastava | G10L 25/78 |
| | | | 704/10 |
| 2005/0075859 A1* | 4/2005 | Ramsey | G06F 17/2715 |
| | | | 704/9 |
| 2005/0137855 A1* | 6/2005 | Maxwell, III | G06F 17/2881 |
| | | | 704/9 |
| 2006/0259345 A1* | 11/2006 | Stetina | G06F 9/451 |
| | | | 704/9 |
| 2007/0078643 A1* | 4/2007 | Sedogbo | G06F 17/2785 |
| | | | 704/9 |
| 2008/0221892 A1* | 9/2008 | Nathan | G06F 17/279 |
| | | | 704/257 |
| 2008/0275694 A1* | 11/2008 | Varone | G06F 17/2785 |
| | | | 704/9 |
| 2008/0294427 A1* | 11/2008 | Cheng | G06F 17/2785 |
| | | | 704/9 |
| 2008/0319735 A1* | 12/2008 | Kambhatla | G06F 17/277 |
| | | | 704/9 |
| 2009/0076799 A1* | 3/2009 | Crouch | G06F 17/2765 |
| | | | 704/9 |
| 2009/0106019 A1* | 4/2009 | Chen | G06F 17/30 |
| | | | 704/9 |
| 2009/0326923 A1* | 12/2009 | Yan | G06F 17/278 |
| | | | 704/9 |
| 2010/0010800 A1* | 1/2010 | Rehberg | G06F 17/2785 |
| | | | 704/9 |
| 2010/0235165 A1* | 9/2010 | Todhunter | G06F 17/279 |
| | | | 704/9 |
| 2011/0119047 A1 | 5/2011 | Ylonen | |
| 2011/0270604 A1* | 11/2011 | Qi | G06F 17/271 |
| | | | 704/9 |
| 2011/0295593 A1* | 12/2011 | Raghuveer | G06F 17/2785 |
| | | | 704/9 |
| 2011/0301941 A1* | 12/2011 | De Vocht | G06F 17/2715 |
| | | | 704/9 |
| 2011/0301942 A1* | 12/2011 | Collobert | G06F 17/271 |
| | | | 704/9 |
| 2012/0078613 A1* | 3/2012 | Kandekar | G06F 17/2745 |
| | | | 704/9 |
| 2012/0150531 A1* | 6/2012 | Bangalore | G06F 17/28 |
| | | | 704/9 |
| 2012/0150532 A1* | 6/2012 | Mirowski | G06F 17/28 |
| | | | 704/9 |
| 2012/0265531 A1 | 10/2012 | Bennett | |
| 2014/0201126 A1 | 7/2014 | Zadeh et al. | |
| 2014/0369596 A1* | 12/2014 | Siskind | G06F 17/3079 |
| | | | 382/158 |
| 2015/0019207 A1* | 1/2015 | Dou | G06F 17/2785 |
| | | | 704/9 |
| 2016/0012818 A1* | 1/2016 | Faizakof | G06F 17/30705 |
| | | | 704/245 |
| 2016/0027437 A1* | 1/2016 | Hong | G10L 15/187 |
| | | | 704/254 |
| 2016/0188568 A1* | 6/2016 | Srinivasan | G06F 17/2785 |
| | | | 704/9 |
| 2017/0228382 A1* | 8/2017 | Haviv | G06N 3/08 |

OTHER PUBLICATIONS

Anonymously; "Method to extract simple and compound terms from text corpuses (without performing full semantic analysis)"; http://ip.com/IPCOM/000220204D; Jul. 25, 2012.

* cited by examiner

SYSTEM, METHOD, AND RECORDING MEDIUM FOR NATURAL LANGUAGE LEARNING

CROSS REFERENCE TO RELATED APPLICATIONS

The present application is a related Application of co-pending U.S. patent application Ser. No. 15/087,032, and co-pending U.S. patent application Ser. No. 15/087,023, each of which is filed on Mar. 31, 2016, the entire contents of which are incorporated herein by reference.

BACKGROUND

The present invention relates generally to a natural language learning system, and more particularly, but not by way of limitation, to a system for extracting from large corpora significant syntactic constructs and applying a word embedding data processing technique in order to get similarities between phrases that have internal structure.

Mapping verbal usage to regular expressions have been considered. Conventional techniques proved that regular expressions extracted corpora can be learned and they are instrumental to a wide range of applications involving semantic processing. Such conventional techniques involve using of ontological categories.

Other conventional techniques rely on bags of words (i.e., a fixed number of lexical features) in order to predict the meaning of input content. Further conventional techniques have used Recurrent Neural Networks (RNN) with success for predicting word similarity.

However, there is a technical problem with the conventional techniques that the ontological categories hinder the accuracy of the proposed method and the reliance on bag of words can limit the prediction of ambiguous terms.

SUMMARY

The inventors have considered the technical solution to the technical problem by using a word embedding processing such as RNN on patterns to build over the discriminative elements picked from the sentence to learn similarity of patterns which encode syntactic slots filled by words from extension of concepts.

In an exemplary embodiment, the present invention can provide a natural language learning system include an analyzing circuit configured to analyze a corpus of sentences stored in a database to identify an internal structure of words in the corpus of sentences, a new word creating circuit configured to create a plurality of new words that are a combination of the internal structure of a word of the words in the corpus of sentences and the word, a clustering circuit configured to cluster the plurality of new words created by the new word creating circuit that match into a plurality of cluster groups, a filtering circuit configured to filter the plurality of cluster groups to create a partial set of each of the plurality of cluster groups, and a word embedding processing circuit configured to obtain vectors for new words by performing word embedding processing on the partial set of each of the plurality of cluster groups.

Further, in another exemplary embodiment, the present invention can provide a natural language learning method, include analyzing a corpus of sentences stored in a database to identify an internal structure of words in the corpus of sentences, creating a plurality of new words that are a combination of the internal structure of a word of the words in the corpus of sentences and the word, clustering the plurality of new words created by the creating that match into a plurality of cluster groups, filtering the plurality of cluster groups to create a partial set of each of the plurality of cluster groups, and performing word embedding processing on the partial set of each of the plurality of cluster groups to obtain vectors for new words.

Even further, in another exemplary embodiment, the present invention can provide a non-transitory computer-readable recording medium recording a natural language learning program, the program causing a computer to perform: analyzing a corpus of sentences stored in a database to identify an internal structure of words in the corpus of sentences, creating a plurality of new words that are a combination of the internal structure of a word of the words in the corpus of sentences and the word, clustering the plurality of new words created by the creating that match into a plurality of cluster groups, filtering the plurality of cluster groups to create a partial set of each of the plurality of cluster groups, and performing word embedding processing on the partial set of each of the plurality of cluster groups to obtain vectors for new words.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
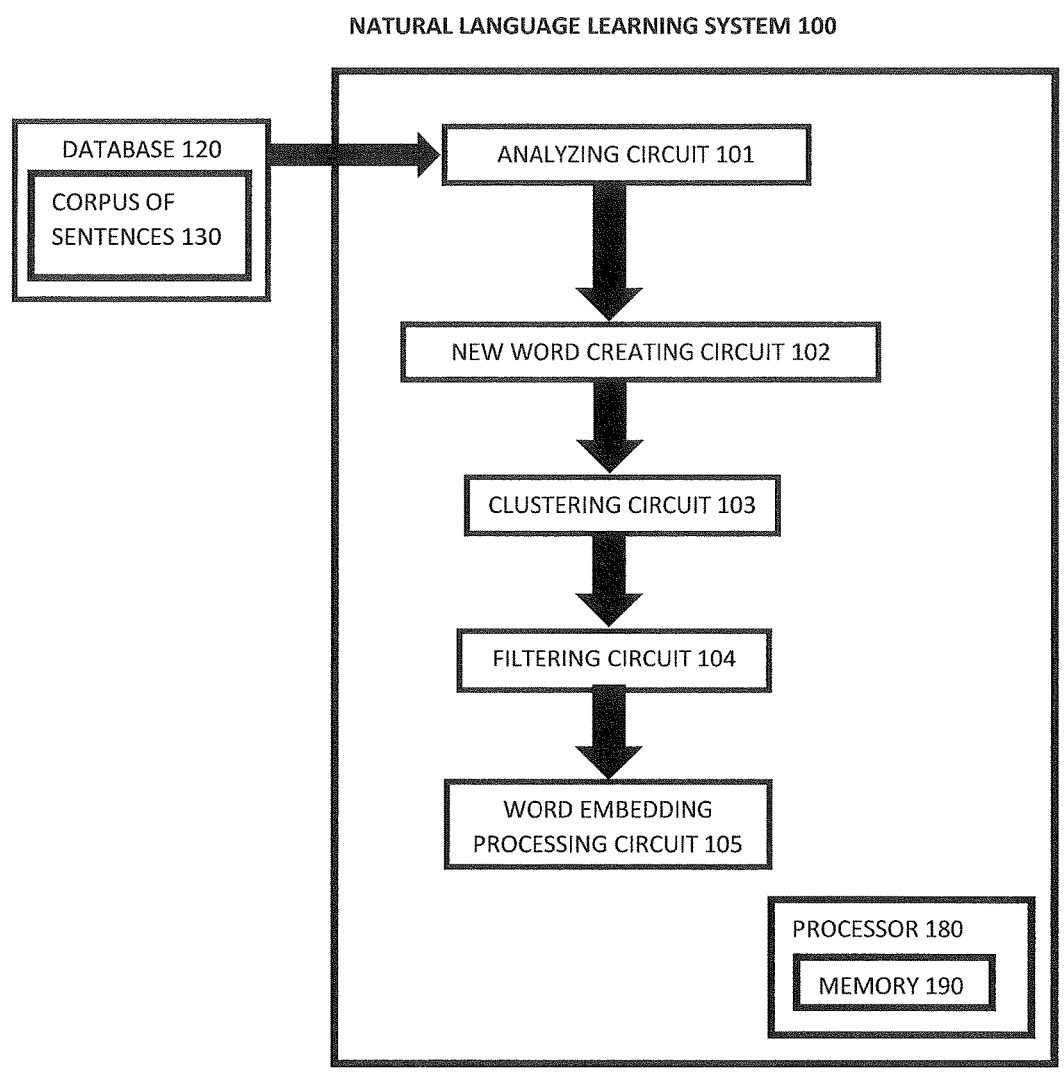
FIG. 1 exemplarily shows a block diagram illustrating a configuration of a natural language learning system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the natural language learning system 100 includes an analyzing circuit 101, a new word creating circuit 102, a clustering circuit 103, a filtering circuit 104, and a word embedding processing circuit 105. The natural language learning system 100 includes a processor 180 and a memory 190, with the memory 190 storing instructions to cause the processor 180 to execute each circuit of natural language learning system 100. The processor and memory may be physical hardware components, or a combination of hardware and software components.

Although the natural language learning system 100 includes various circuits, it should be noted that a natural language learning system can include modules in which the memory 190 stores instructions to cause the processor 180 to execute each module of natural language learning system 100.

Also, each circuit can be a stand-alone device, unit, module, etc. that can be interconnected to cooperatively produce a transformation to a result.

With the use of these various circuits, the natural language learning system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states by means of further feature analysis of subgraphs, including dimensionality reduction of the subgraphs, for example by means of graphical analysis, which extracts topological features and categorizes the resultant subgraph and its associated feature nodes and edges within a subgraph feature space.

Figure 3:
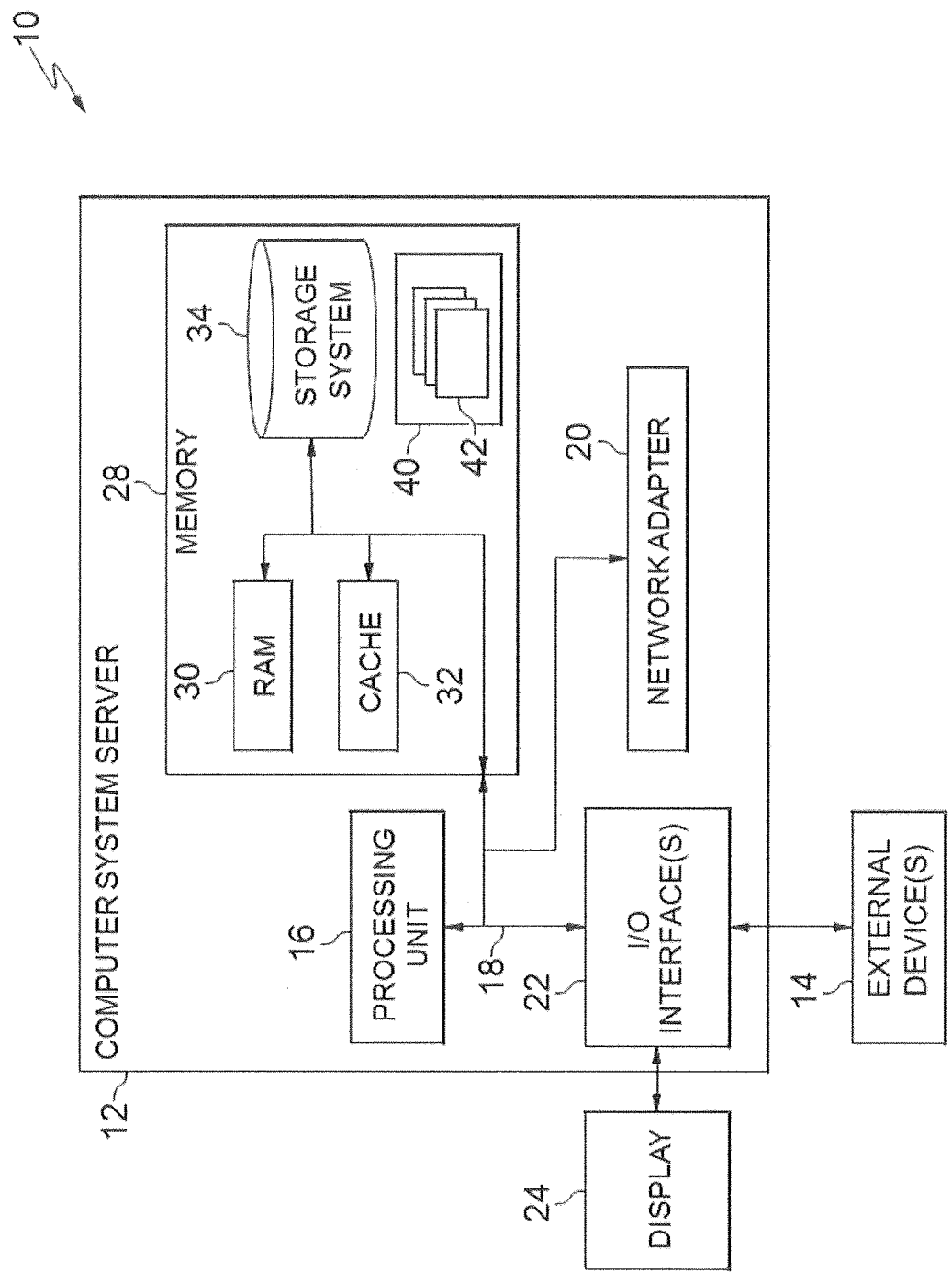
FIG. 3 depicts a cloud computing node 10 according to an embodiment of the present invention.
Figure 4:
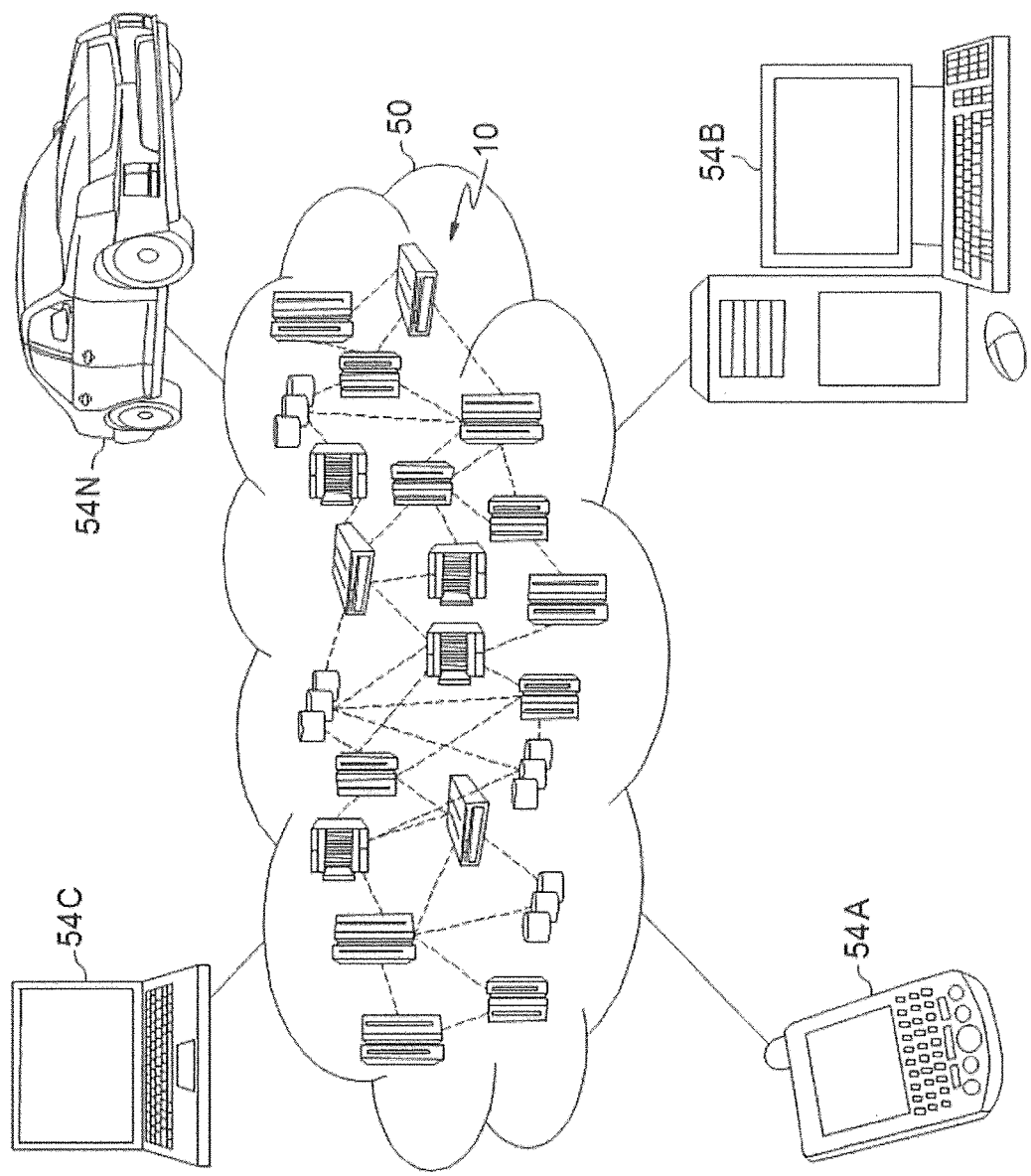
FIG. 4 depicts a cloud computing environment 50 according to another embodiment of the present invention.
Figure 5:
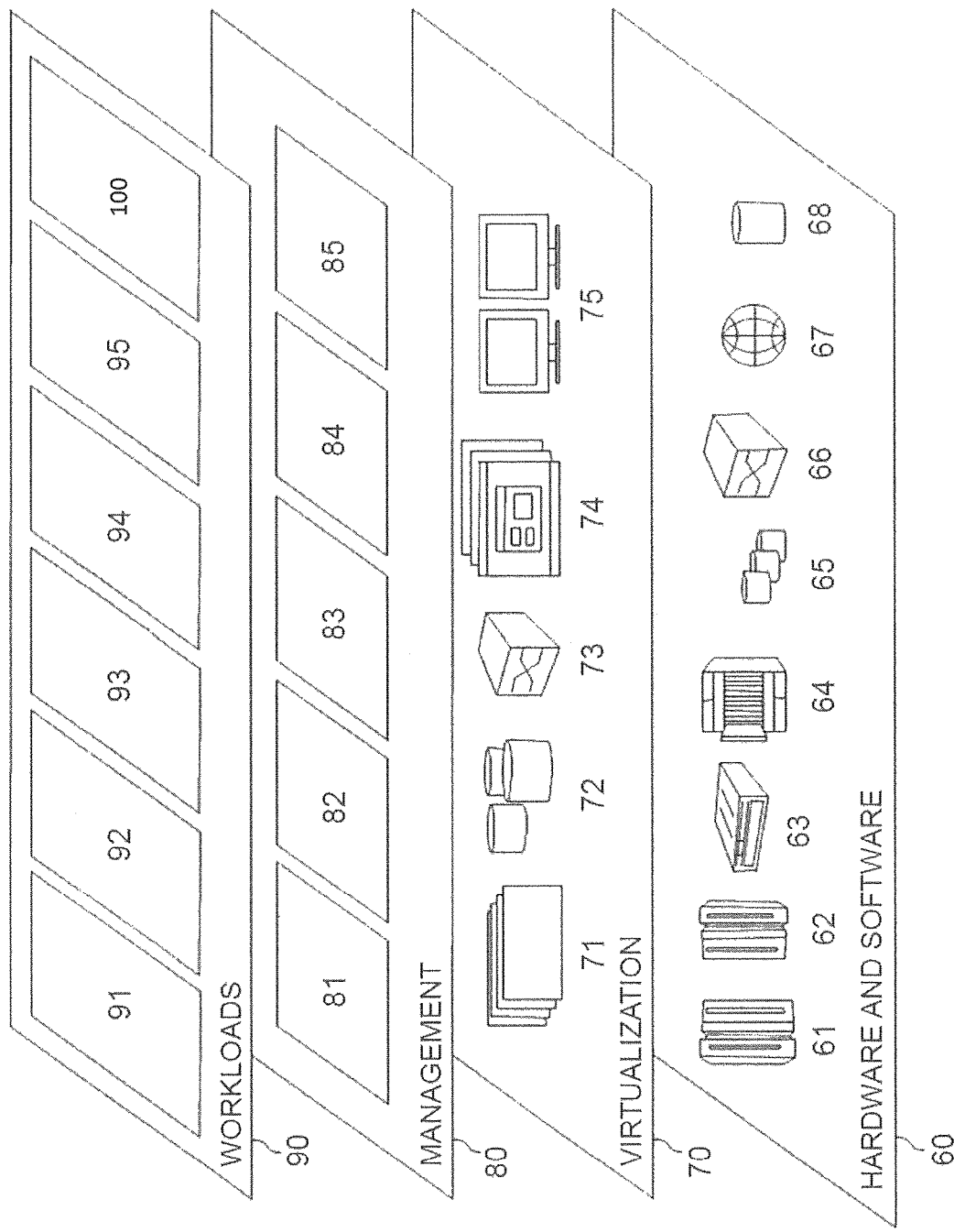
FIG. 5 depicts abstraction model layers according to an embodiment of the present invention.

Although as shown in FIGS. 3-5 and as described later, the computer system/server 12 is exemplarily shown in cloud computing node 10 as a general-purpose computing circuit which may execute in a layer the natural language learning system 100 (FIG. 5), it is noted that the present invention can be implemented outside of the cloud environment.

The analyzing circuit 101 analyzes the corpus of sentences 130 stored in the database 120 to identify the internal structure of the word in the sentence, like verbal group, noun phrases, subject, etc. Thus, the analyzing circuit 101 identifies the syntactical feature of the words of the corpus of sentences 130.

Based on the identified syntactical feature of the word, the new word creating circuit 102 creates a new word that is a combination of the syntactical feature and the word along with a key cite references which sentence of the corpus of sentences that the word was identified to be located in. For example, if the identified word by the analyzing circuit 101 is "house" and the syntactical feature of "house" is "subject", the new word creating circuit 102 creates a new word "subject_house". If the word house appears in another sentence or again in the same sentence and is a verb, the new word creating circuit 102 creates a new word for "house" as "verb_house". The new word creating circuit 102 continuously creates new words for the corpus of sentences.

The clustering circuit 103 clusters each matching new word together into a group. For example, all of the "subject_house" and "verb_house" new words are respectively clustered together by the clustering circuit 103 including the key cite to the sentences which used the word "house". In this manner, the clustering circuit 103 clusters the new words according to their syntactical usage.

The filtering circuit 104 filters the clustered groups of new words such that the filtering circuit 104 outputs a partial set of each of the clustered groups of new words. The filtering circuit 104 receives the clustered groups of new words and outputs a set of sentences to be considered for word embedding by the word embedding processing circuit 105.

That is, the analyzing circuit 101, the new word creating circuit 102, the clustering circuit 103, and the filtering circuit 104 cooperatively parse the clustered group of new words (Step 1), create complex words which are obtained by combining lemmas and syntactic functions (Step 2), decompose each sentence into a set of verbal phrases with their subcategorization frame made of pseudo words (Step 3), and filter out verbal phrases with no concludent lexical feature (Step 4) to output to the word embedding processing circuit 105.

The word embedding processing circuit 105 obtains vectors that encode syntactic structure and concepts by performing processing by word embedding processing on the filtered partial set of each of the clustered groups of new words. For example, the word embedding processing can be a Recurrent Neural Networks (RNN). By performing the word embedding processing on the filtered partial set of the clustered groups of new words, the vectors representing the syntactical information are much more accurate than performing RNN on a bag of words.

Figure 2:
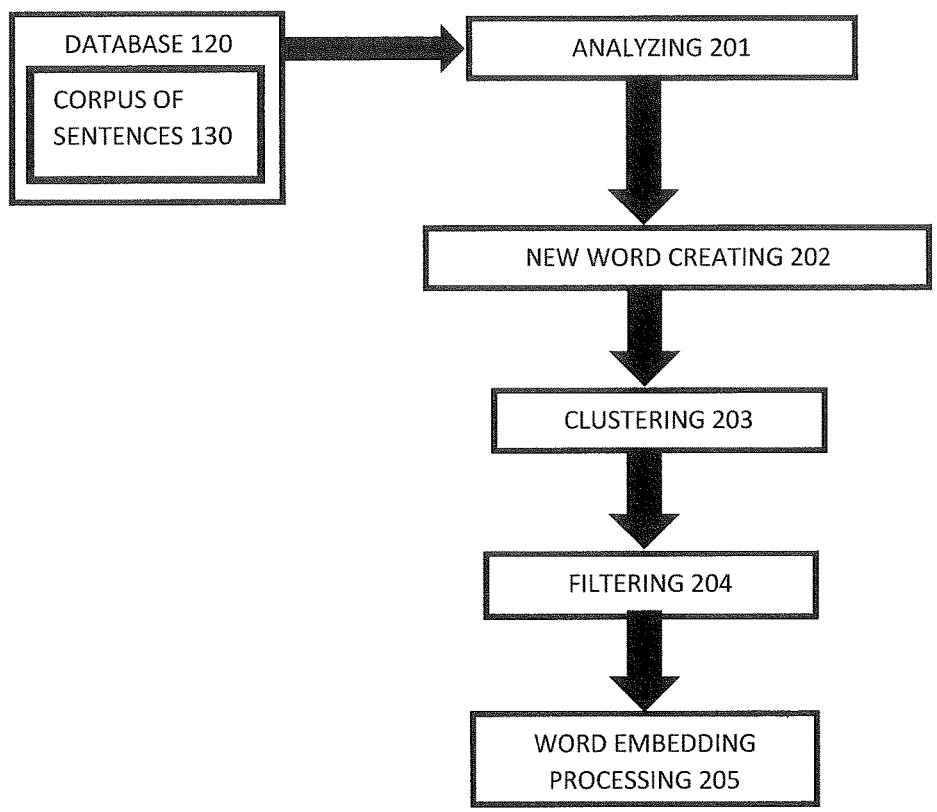
FIG. 2 exemplarily shows a high level flow chart for a natural language learning method 200.

FIG. 2 shows a high level flow chart for a method 200 for natural language learning.

Step 201 analyzes the corpus of sentences 130 stored in the database 120 to identify the internal structure of the word in the sentence, like verbal group, noun phrases, subject, etc. Thus, Step 201 identifies the syntactical feature of the words of the corpus of sentences 130.

Based on the identified syntactical feature of the word, Step 202 creates a new word that is a combination of the syntactical feature and the word along with a key cite references which sentence of the corpus of sentences that the word was identified to be located in.

Step 203 clusters each matching new word together into a group. For example, all of the "subject_house" and "verb_house" new words are respectively clustered together by the clustering circuit 103 including the key cite to the sentences which used the word "house".

Step 204 filters the clustered groups of new words such that the filtering circuit 104 outputs a partial set of each of the clustered groups of new words.

That is, Steps 201, 202, 203, and 204 cooperatively parse the clustered group of new words (Step 1), create complex words which are obtained by combining lemmas and syntactic functions (Step 2), decompose each sentence into a set of verbal phrases with their subcategorization frame made of pseudo words (Step 3), and filter out verbal phrases with no concludent lexical feature (Step 4) to output to Step 205.

Step 205 obtains vectors that encode syntactic structure and concepts by performing processing by word embedding processing on the filtered partial set of each of the clustered groups of new words. For example, the word embedding processing can be a Recurrent Neural Networks (RNN). By performing the word embedding processing on the filtered partial set of the clustered groups of new words, the vectors representing the syntactical information are much more accurate than performing RNN on a bag of words.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may, include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the natural language learning system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A natural language learning system comprising:
an analyzing circuit configured to analyze a corpus of sentences stored in a database to identify an internal linguistic structure of words in the corpus of sentences;
a new word creating circuit configured to create a plurality of new words that comprise a combination of the internal linguistic structure of a word of the words in the corpus of sentences and the word along with a sentence in the corpus of sentences in which the word is located, wherein each of the plurality of the new words includes the word and the internal linguistic structure prefixed to the word to paraphrase the corpus of sentences;
a clustering circuit configured to cluster the plurality of new words created by the new word creating circuit that match into a plurality of cluster groups;
a filtering circuit configured to filter the plurality of cluster groups to create a partial set of each of the plurality of cluster groups; and
a word embedding processing circuit configured to obtain vectors for new words by performing word embedding processing on the partial set of each of the plurality of cluster groups and grouping words into higher constituents in the cluster groups,
wherein the word embedding processing is used to build over discriminative elements picked from the sentences to learn a similarity of patterns which encode syntactic structure slots filled by words from extension of concepts of the new words and to determine whether two phrases in the corpus of sentences are paradigmatically equivalent, and
wherein the analyzing circuit, the new word creating circuit, the clustering circuit, and the filtering circuit cooperatively parse the clustered group of new words, create complex words as the new words which are obtained by combining lemmas and syntactic functions from the internal linguistic structure of the word of the words in the corpus of the sentences, decompose each sentence of the corpus of sentences into a set of the combination of the internal linguistic structure with their subcategorization frame made of pseudo words, and filter out phrases with no concludent lexical feature to output to the word embedding processing circuit.

2. The system of claim 1, wherein the internal linguistic structure of the words comprises a syntactical feature of the words of the corpus of sentences.

3. The system of claim 2, wherein the clustering circuit clusters the plurality of new words based on the syntactical feature matching.

4. The system of claim 1, wherein each of the new words includes a key cite to a sentence of the corpus of sentences in which the word is originally included.

5. The system of claim 1, wherein the plurality of new words are created by combining lemmas and syntactic functions.

6. The system of claim 1, wherein the vectors obtained by the word embedding processing circuit encode the syntactic structure and the concepts of the plurality of new words, and
wherein the word embedding processing comprises a Recurrent Neural Network (RNN) processing.

7. A natural language learning method, comprising:
analyzing a corpus of sentences stored in a database to identify an internal linguistic structure of words in the corpus of sentences;
creating a plurality of new words that comprise a combination of the internal linguistic structure of a word of the words in the corpus of sentences and the word along with a sentence in the corpus of sentences in which the word is located, wherein each of the plurality of the new words includes the word and the internal linguistic structure prefixed to the word to paraphrase the corpus of sentences;
clustering the plurality of new words created by the creating that match into a plurality of cluster groups;
filtering the plurality of cluster groups to create a partial set of each of the plurality of cluster groups; and performing word embedding processing on the partial set of each of the plurality of cluster groups to obtain vectors for new words and grouping words into higher constituents in the cluster groups, wherein the word embedding processing is used to build over discriminative elements picked from the sentences to learn a similarity of patterns which encode syntactic structure slots filled by words from extension of concepts of the new words and to determine whether two phrases in the corpus of sentences are paradigmatically equivalent, and wherein the analyzing, the creating, the clustering, and the filtering cooperatively parse the clustered group of new words, create complex words as the new words which are obtained by combining lemmas and syntactic functions from the internal linguistic structure of the word of the words in the corpus of the sentences, decompose each sentence of the corpus of sentences into a set of the combination of the internal linguistic structure with their subcategorization frame made of pseudo words, and filter out phrases with no concludent lexical feature to output to the performing word embedding processing.

8. The method of claim 7, wherein the internal linguistic structure of the words comprises a syntactical feature of the words of the corpus of sentences.

9. The method of claim 8, wherein the clustering clusters the plurality of new words based on the syntactical feature matching.

10. The method of claim 7, wherein each of the new words includes a key cite to a sentence of the corpus of sentences in which the word is originally included.

11. The method of claim 7, wherein the creating creates the plurality of new words by combining lemmas and syntactic functions.

12. The method of claim 7, wherein the vectors obtained by the performing encode the syntactic structure and the concepts of the plurality of new words.

13. The method of claim 7, wherein the word embedding processing comprises a Recurrent Neural Network (RNN) processing.

14. A non-transitory computer-readable recording medium recording a natural language learning program, the program causing a computer to perform:

analyzing a corpus of sentences stored in a database to identify an internal linguistic structure of words in the corpus of sentences;

creating a plurality of new words that comprise a combination of the internal linguistic structure of a word of the words in the corpus of sentences and the word along with a sentence in the corpus of sentences in which the word is located, wherein each of the plurality of the new words includes the word and the internal linguistic structure prefixed to the word to paraphrase the corpus of sentences;

clustering the plurality of new words created by the creating that match into a plurality of cluster groups;

filtering the plurality of cluster groups to create a partial set of each of the plurality of cluster groups; and performing word embedding processing on the partial set of each of the plurality of cluster groups to obtain vectors for new words and grouping words into higher constituents in the cluster groups, wherein the word embedding processing is used to build over discriminative elements picked from the sentences to learn a similarity of patterns which encode syntactic structure slots filled by words from extension of concepts of the new words and to determine whether two phrases in the corpus of sentences are paradigmatically equivalent, and wherein the analyzing, the creating, the clustering, and the filtering cooperatively parse the clustered group of new words, create complex words as the new words which are obtained by combining lemmas and syntactic functions from the internal linguistic structure of the word of the words in the corpus of the sentences, decompose each sentence of the corpus of sentences, into a set of the combination of the internal linguistic structure with their subcategorization frame made of pseudo words, and filter out phrases with no concludent lexical feature to output to the performing word embedding processing.

15. The non-transitory computer-readable recording medium of claim 14, wherein the internal linguistic structure of the words comprises a syntactical feature of the words of the corpus of sentences.

16. The non-transitory computer-readable recording medium of claim 15, wherein each of the clustering clusters the plurality of new words based on the syntactical feature matching.

17. The non-transitory computer-readable recording medium of claim 14, wherein the new words include a key cite to a sentence of the corpus of sentences in which the word is originally included.

18. The non-transitory computer-readable recording medium of claim 14, wherein the creating creates the plurality of new words by combining lemmas and syntactic functions.

19. The non-transitory computer-readable recording medium of claim 14, wherein the vectors obtained by the performing encode the syntactic structure and the concepts of the plurality of new words.

* * * * *